「(12) United States Patent
Ke et al.

(10) Patent No.: US 11,212,128 B2
(45) Date of Patent: Dec. 28, 2021

(54) DATA TRANSMISSION CONTROL METHOD, DATA TRANSMISSION CONTROL APPARATUS, AND ELECTRONIC DEVICE

(71) Applicant: GUANGDONG OPPO MOBILE TELECOMMUNICATIONS CORP., LTD., Guangdong (CN)

(72) Inventors: Shixing Ke, Guangdong (CN); Yadong Hu, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/144,675

(22) Filed: Jan. 8, 2021

(65) Prior Publication Data

US 2021/0135894 A1 May 6, 2021

Related U.S. Application Data

(63) Continuation of application No. PCT/CN2019/095457, filed on Jul. 10, 2019.

(30) Foreign Application Priority Data

Aug. 2, 2018 (CN) .......................... 201810872510.6

(51) Int. Cl.
H04L 12/18 (2006.01)
(52) U.S. Cl.
CPC ...... *H04L 12/1818* (2013.01); *H04L 12/1822* (2013.01); *H04L 12/1827* (2013.01); *H04L 12/1831* (2013.01)
(58) Field of Classification Search
USPC ....................................................... 370/260
See application file for complete search history.

(56) References Cited

U.S. PATENT DOCUMENTS 9,143,979 B1 * 9/2015 Lambert ............... H04W 8/005
9,462,464 B2 * 10/2016 Patil ...................... H04W 12/06
(Continued)

FOREIGN PATENT DOCUMENTS

CN 103327290 A 9/2013
CN 105554869 A 5/2016
(Continued)

OTHER PUBLICATIONS

International Search Report with English Translation for International application No. PCT/CN2019/095457, dated Sep. 12, 2019 (13 pages).
(Continued)

*Primary Examiner* — Amal S Zenati
(74) *Attorney, Agent, or Firm* — Young Basile Hanlon & MacFarlane, P.C.

(57) ABSTRACT

A data transmission control method includes: acquiring identities of multiple conference members required to attend a conference when a local area network conference request is detected, wherein the conference members correspond to multiple second NAN devices; determining communication levels of the conference members based on the identities of the conference members, and establishing a corresponding relation between transmission levels of data resources and the communication levels of the conference members; creating a first NAN conference group, and inviting the at least one second NAN device to join the first NAN conference group; and performing data transmission in the first NAN conference group based on the corresponding relation.

20 Claims, 5 Drawing Sheets

(56) References Cited

U.S. PATENT DOCUMENTS

| | | | |
|---|---|---|---|
| 2015/0098388 A1* | 4/2015 | Fang | H04W 8/005 370/328 |
| 2016/0353269 A1* | 12/2016 | Kasslin | H04W 48/16 |
| 2017/0064492 A1 | 3/2017 | Qi et al. | |
| 2017/0311341 A1 | 10/2017 | Patil et al. | |

FOREIGN PATENT DOCUMENTS

| | | | |
|---|---|---|---|
| CN | 106713253 A | 5/2017 | |
| CN | 106789583 A | 5/2017 | |
| CN | 109005044 A | 12/2018 | |
| WO | 2017051497 A1 | 3/2017 | |

OTHER PUBLICATIONS

First Office Action with English Translation from China patent office in a counterpart Chinese patent Application 201810872510.6, dated Oct. 10, 2019 (15 pages).

Extended European Search Report for EP Application 19843514.1 dated Jul. 15, 2021. (9 pages).

\* cited by examiner

DATA TRANSMISSION CONTROL METHOD, DATA TRANSMISSION CONTROL APPARATUS, AND ELECTRONIC DEVICE

CROSS-REFERENCE TO RELATED APPLICATION(S)

The present application is a continuation-application of International (PCT) Patent Application No. PCT/CN2019/095457 filed on Jul. 10, 2019, which claims foreign priority of Chinese Patent Application No. 201810872510.6, filed on Aug. 2, 2018, the entire contents of which are hereby incorporated by reference in their entireties.

TECHNICAL FIELD

The present disclosure generally relates to electronic devices, and in particular to a data transmission control method, a data transmission control apparatus, and an electronic device.

BACKGROUND

Most of devices in the art may achieve a conference function such as voice calls and video chats via a mobile communication network. The mobile communication network is required to transmit communication information between users. Thus, achievement of the conference function may be restricted by the mobile communication network, and safety, privacy and fluency of the conference may not be satisfied.

SUMMARY

In a first aspect, the present disclosure provides a data transmission control method implemented in a first Neighbor Awareness Network (NAN) device. The method includes: acquiring identities of a plurality of conference members needing to attend a conference when a local area network conference request is detected, wherein the plurality of conference members correspond to a plurality of NAN devices which include the first NAN device and at least one second NAN device; determining communication levels of the plurality of conference members based on the identities of the plurality of conference members, and establishing a corresponding relation between transmission levels of data resources and the communication levels of the plurality of conference members; creating a first NAN conference group, and inviting the at least one second NAN device to join the first NAN conference group; and performing data transmission in the first NAN conference group based on the corresponding relation.

In a second aspect, the present disclosure provides a data transmission control apparatus implemented in a first Neighbor Awareness Network (NAN) device. The data transmission control apparatus includes a processing unit and a communication unit.

The processing unit is configured to: acquire identities of a plurality of conference members needing to attend a conference through the communication unit when a local area network conference request is detected, wherein the plurality of conference members correspond to a plurality of NAN devices which include the first NAN device and at least one second NAN device; determine communication levels of the plurality of conference members based on the identities of the plurality of conference members, and establish a corresponding relation between transmission levels of data resources and the communication levels of the plurality of conference members; create a first NAN conference group, and invite the at least one second NAN device to join the first NAN conference group; and perform data transmission in the first NAN conference group based on the corresponding relation.

In a third aspect, the present disclosure provides an electronic device including a processor, a memory, a communication interface and one or more programs. The one or more programs are stored in the memory, and are configured to be executed by the processor to perform operations of: acquiring an identity of each of a plurality of conference members required to attend a conference in response to a local area network conference request being detected, wherein the plurality of conference members correspond to a plurality of NAN devices, and the plurality of NAN devices include the first NAN device and at least one second NAN device; determining a communication level of each of the plurality of conference members based on the identity of each of the plurality of conference members, and establishing a corresponding relation between a transmission level of a data resource and a communication level of each of the plurality of conference members; creating a first NAN conference group, and inviting the at least one second NAN device to join the first NAN conference group; and performing data transmission in the first NAN conference group based on the corresponding relation.

BRIEF DESCRIPTION OF DRAWINGS

In order to clearly explain the technical solutions in the embodiments of the present disclosure, the drawings used in the description of the embodiments will be briefly described below. Obviously, the drawings in the following description are merely some embodiments of the present disclosure. For those of ordinary skill in the art, other drawings may also be obtained based on these drawings without any creative work.

DETAILED DESCRIPTION

Figure 1:
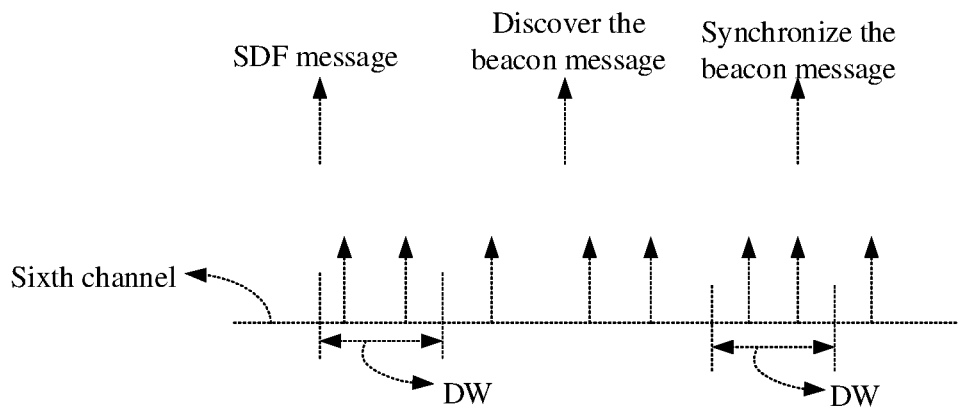
FIG. 1 is a schematic diagram of discovery windows (DWs) of a cluster of an electronic device according to an embodiment of the present disclosure.

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

The terms "first", "second", and the like used in the specification, the claims, and the accompany drawings of the present disclosure are to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units. Instead, it may optionally include other steps or units that are not listed; alternatively, other steps or units inherent to the process, method, product, or device may also be included.

The term "implementation" referred to herein means that a particular feature, structure, or characteristic described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

The first Neighbor Awareness Network (NAN) device provided in embodiments of the present disclosure may be an electronic device having a NAN communication function. The electronic device may include a handheld device, an in-vehicle device, a wearable device, a computing device or other processing device connected to a wireless modem which has wireless communication function. The electronic device may also include various kinds of user equipment (UE), mobile stations (MS), terminal devices etc.

Embodiments of the present disclosure will be explained in detail below.

The NAN mechanism is to be explained herein. The neighbor awareness network (NAN for short) mechanism is a standard made by the wireless fidelity (WIFI) Alliance. The standard aims to synchronize all devices participating in the NAN mechanism without a central node, and make the devices to perform the maintenance task and the service discovery task of the NAN mechanism in a discovery window (DW for short) of the NAN mechanism. The service discovery is achieved by sending a service discovery frame (SDF for short) message. The service discovery frame message includes an inquiring message or a broadcasting message. The devices may establish a corresponding connection based on information acquired while performing the service discovery, and then perform data transmission.

In details, in the WIFI alliance standard, a sixth channel may be a discovery channel in the NAN mechanism. In the sixth channel, a duration of the discovery window is constant for each cluster, and a time interval between any two adjacent discovery window of the cluster is also constant.

In a first aspect, the present disclosure provides a data transmission control method implemented in a first Neighbor Awareness Network (NAN) device. The method includes: acquiring identities of a plurality of conference members needing to attend a conference when a local area network conference request is detected, wherein the plurality of conference members correspond to a plurality of NAN devices which include the first NAN device and at least one second NAN device; determining communication levels of the plurality of conference members based on the identities of the plurality of conference members, and establishing a corresponding relation between transmission levels of data resources and the communication levels of the plurality of conference members; creating a first NAN conference group, and inviting the at least one second NAN device to join the first NAN conference group; and performing data transmission in the first NAN conference group based on the corresponding relation.

In some embodiments, the performing data transmission in the first NAN conference group based on the corresponding relation, includes: acquiring a transmission level of a first data resource to be transmitted; inquiring the corresponding relation and determining a target communication level of a conference member corresponding to the transmission level of the first data resource; and transmitting the first data resource a second NAN device of the conference member having the target communication level.

In some embodiments, the transmitting the first data resource a second NAN device of the conference member having the target communication level, includes: detecting presence of a second data resource to be transmitted in the first NAN conference group; selecting a first transmission channel from a transmission channel collection, and transmitting the first data resource through the first transmission channel, in response to the second data resource being not present; and determining a second transmission channel and a target data transmission window of the first data resource, and transmitting the first data resource through the second transmission channel in the target data transmission window, in response to the second data resource being present.

In some embodiments, the acquiring an identity of each of a plurality of conference members required to attend a conference, includes: activating a NAN function, and using the NAN function to broadcast a service discovery frame (SDF) in a first discovery window (DW), wherein the SDF comprises a service descriptor attribute (SDA) configured to indicate conference information of the local area network conference request; receiving a feedback message from each of the at least one second NAN device in the first DW; and acquiring the identity of each conference member of the at least one second NAN device based on the feedback message.

In some embodiments, the SDA of the SDF includes a conference name and information of the plurality of conference members.

In some embodiments, the acquiring an identity of each of a plurality of conference members required to attend a conference, includes: searching a historical conference record database, and acquiring a historical conference record of each of the plurality of conference members required to attend the conference; and determining the identity of each of the plurality of conference members based on the acquired historical conference record.

In some embodiments, after the establishing a corresponding relation between a transmission level of a data resource and a communication level of each of the plurality of conference members, the method further includes: transmitting the corresponding relation to each of the at least one second NAN device.

In some embodiments, the method further includes: receiving a conference attending request from a third NAN device; and allowing the third NAN device to join the first NAN conference group in response to verification information of the third NAN device being verified and detected.

In some embodiments, in the corresponding relation, the transmission level of the data resource corresponds to one or more transmission levels of each of the plurality of conference members.

In a second aspect, the present disclosure provides a data transmission control apparatus implemented in a first Neighbor Awareness Network (NAN) device. The data transmission control apparatus includes a processing unit and a communication unit. The processing unit is configured to: acquire identities of a plurality of conference members needing to attend a conference through the communication unit when a local area network conference request is detected, wherein the plurality of conference members correspond to a plurality of NAN devices which include the first NAN device and at least one second NAN device; determine communication levels of the plurality of conference members based on the identities of the plurality of conference members, and establish a corresponding relation between transmission levels of data resources and the communication levels of the plurality of conference members; create a first NAN conference group, and invite the at least one second NAN device to join the first NAN conference group; and perform data transmission in the first NAN conference group based on the corresponding relation.

In a third aspect, the present disclosure provides an electronic device including a processor, a memory, a communication interface and one or more programs. The one or more programs are stored in the memory, and are configured to be executed by the processor to perform operations of: acquiring an identity of each of a plurality of conference members required to attend a conference in response to a local area network conference request being detected, wherein the plurality of conference members correspond to a plurality of NAN devices, and the plurality of NAN devices include the first NAN device and at least one second NAN device; determining a communication level of each of the plurality of conference members based on the identity of each of the plurality of conference members, and establishing a corresponding relation between a transmission level of a data resource and a communication level of each of the plurality of conference members; creating a first NAN conference group, and inviting the at least one second NAN device to join the first NAN conference group; and performing data transmission in the first NAN conference group based on the corresponding relation.

In some embodiments, when performing data transmission in the first NAN conference group based on the corresponding relation, the one or more programs are further executed by the processor to perform operations of: acquiring a transmission level of a first data resource to be transmitted; inquiring the corresponding relation and determining a target communication level of a conference member corresponding to the transmission level of the first data resource; and transmitting the first data resource a second NAN device of the conference member having the target communication level.

In some embodiments, when transmitting the first data resource a second NAN device of the conference member having the target communication level, the one or more programs are further executed by the processor to perform operations of: detecting presence of a second data resource to be transmitted in the first NAN conference group; selecting a first transmission channel from a transmission channel collection, and transmitting the first data resource through the first transmission channel, in response to the second data resource being not present; and determining a second transmission channel and a target data transmission window of the first data resource, and transmitting the first data resource through the second transmission channel in the target data transmission window, in response to the second data resource being present.

In some embodiments, when acquiring an identity of each of a plurality of conference members required to attend a conference, the one or more programs are further executed by the processor to perform operations of: activating a NAN function, and using the NAN function to broadcast a service discovery frame (SDF) in a first discovery window (DW), wherein the SDF comprises a service descriptor attribute (SDA) configured to indicate conference information of the local area network conference request; receiving a feedback message from each of the at least one second NAN device in the first DW; and acquiring the identity of each conference member of the at least one second NAN device based on the feedback message.

In some embodiments, the SDA of the SDF includes a conference name and information of the plurality of conference members.

In some embodiments, when acquiring an identity of each of a plurality of conference members required to attend a conference, the one or more programs are further executed by the processor to perform operations of: searching a historical conference record database, and acquiring a historical conference record of each of the plurality of conference members required to attend the conference; and determining the identity of each of the plurality of conference members based on the acquired historical conference record.

In some embodiments, after the establishing a corresponding relation between a transmission level of a data resource and a communication level of each of the plurality of conference members, the one or more programs are further executed by the processor to perform operations of: transmitting the corresponding relation to each of the at least one second NAN device.

In some embodiments, the one or more programs are further executed by the processor to perform operations of: receiving a conference attending request from a third NAN device; and allowing the third NAN device to join the first NAN conference group in response to verification information of the third NAN device being verified and detected.

In some embodiments, in the corresponding relation, the transmission level of the data resource corresponds to one or more transmission levels of each of the plurality of conference members.

In some embodiments, the one or more programs are further executed by the processor to perform operations of: acquiring, by the at least one second NAN device, information of the first NAN conference group and determining whether to join the first NAN conference group; and performing an interaction, by the first NAN device and the at least one second NAN device, enabling the at least one second NAN device to join the first NAN conference group.

FIG. 1 is a schematic diagram of a discovery window (DW) of a cluster. According to the standard of the WIFI alliance, the NAN device in the cluster may transmit a service discovery frame (SDF) message in the DW to perform service discovery. The NAN device in the cluster may transmit a discovery beacon message outside the DW to declare existence of the cluster. Each NAN device in the cluster may perform service discovery in the DW to discover other NAN devices capable of performing data transmission with it. After the service discovery, at least two NAN devices required to perform data transmission between each other may arrange a time-frequency resource and a network connecting manner in the DW. After the DW, the at least two NAN devices required to perform data transmission may establish a corresponding NAN network without a central node based on the arranged network connecting manner in the arranged time-frequency resource.

Figure 2:
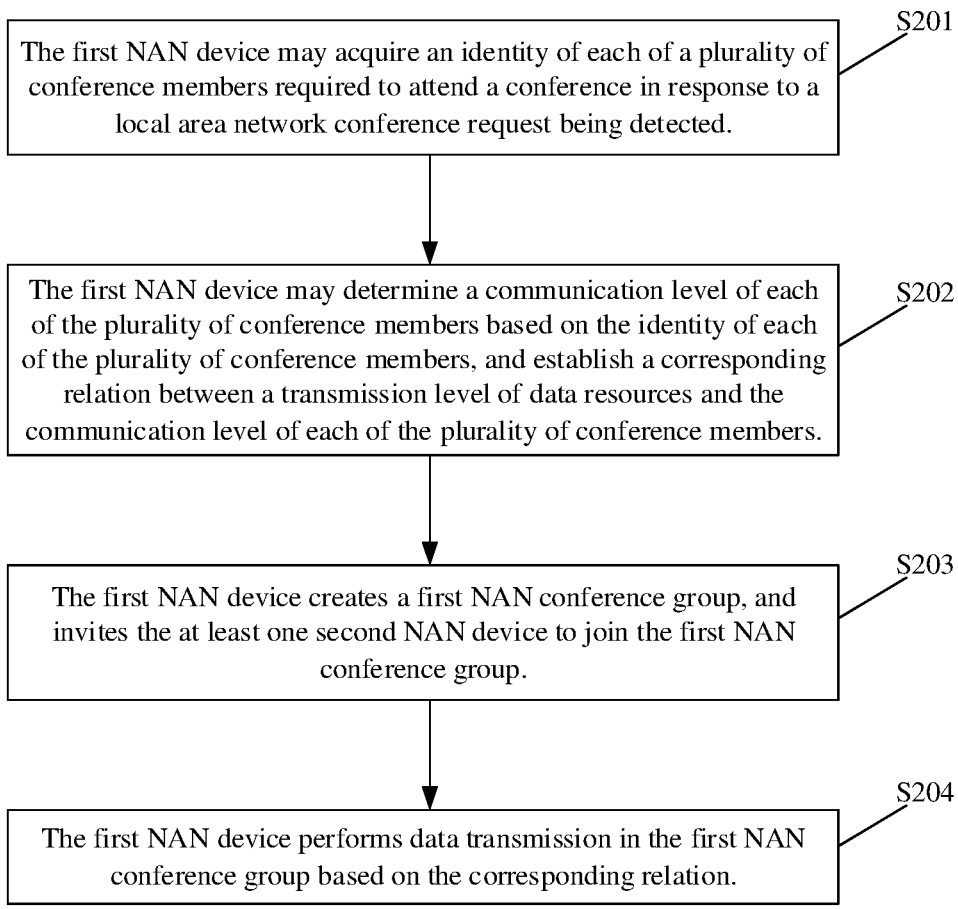
FIG. 2 illustrates a flow chart of a data transmission control method according to an embodiment of the present disclosure.

FIG. 2 illustrates a flowchart of a data transmission control method applied to a first NAN device according to an embodiment of the present disclosure. As shown in the figure, the data transmission control method includes following operations.

In an operation S201, the first NAN device may acquire an identity of each of a plurality of conference members required to attend a conference in response to a local area network conference request being detected. The plurality of conference members correspond to a plurality of NAN devices. The plurality of NAN devices include the first NAN device and at least one second NAN device.

It should be noted that the plurality of conference members required to attend the conference may include a first conference member and at least one second conference member. The first conference member may correspond to the first NAN device, and the at least one second conference member may correspond to the at least one second NAN device. Therefore, identities acquired by the first NAN device may include an identity of the first conference member and an identity of each of the at least one second conference member.

The local area network conference request may be proactively triggered by a user through, for example, selecting a conference function of the first NAN device, and a triggering condition is not limited in the present disclosure. The identity of each of the plurality of conference members may include various information indicating the identity, such as a job position of the user, a name of the user and so on. The plurality of conference members required to attend the conference may be selected by the user of the first NAN device. For example, the user of the first NAN device may select conference members from a contact list or a Wechat friend list. Alternatively, the conference members required to attend the meeting may also be confirmed through mutual confirmation between the first NAN device and the NAN devices of other users. In this case, the user of the first NAN device may not completely confirm all the conference members. In this circumstance, other users may acquire conference information through their own NAN devices, and may make their own decision of whether to join a conference group of the first NAN device. An interaction between the first NAN device and other NAN devices (i.e. the at least one second NAN device) may be performed to accept the user of the each of the at least one second NAN device as the conference member. The method with the present triggering operation may be flexible and rapid.

In some embodiments, the first NAN device and at least one second NAN device may join a first NAN in advance, and perform service discovery, such as conference service negotiation, in the DW of the first NAN.

In an operation of S202, the first NAN device may determine a communication level of each of the plurality of conference members (i.e. the conference member corresponding to the first NAN device and each of the at least one second NAN device) based on the identity of each of the plurality of conference members, and establish a corresponding relation between a transmission level of a data resource and the communication level of each of the plurality of conference members.

In some embodiments, the transmission level of the data resource may correspond to one or more transmission levels.

In some embodiments, in response to the identity of each of the plurality of conference members being the job position, the first NAN device may set the communication level based on a type of the job position. For example, the plurality of conference members include a shareholder, a general manager, a group leader, and a group member. Based on job positions of the conference members, the communication level of the shareholder may be set as a first communication level, the communication level of the general manager may be set as a second communication level, the communication level of the group leader may be set as a third communication level, and the communication level of the group member may be set as a fourth communication level. The first communication level is higher than the second communication level, the second communication level is higher than the third communication level, and the third communication level is higher than the fourth communication level. The transmission level of data resource may be preset and include a high transmission level, a medium transmission level, and a low transmission level. For example, a transmission level of a development plan of a company may be set as the high transmission level corresponding to the first communication level and the second communication level, that is, the development plan of the company may be shared by the shareholder and the general manager only. A transmission level of a company policy may be set as the low transmission level corresponding to the first communication level, the second communication level, the third communication level, and the fourth communication level, that is, the company policy may be shared by all the conference members.

In response to the identity of each of the plurality of conference members being the name of the user, a relation of the conference members may be inquired based on names of the users and the communication level may be determined based on the relation of the conference members. Determining the communication level will not be repeatedly described hereinafter.

In an operation S203, the first NAN device creates a first NAN conference group, and invites the at least one second NAN device to join the first NAN conference group.

In details, the first NAN device may share a group identifier of the first NAN conference group to the at least one second NAN device to notify the at least one second NAN device to join the first NAN conference group.

In an operation S204, the first NAN device performs data transmission in the first NAN conference group based on the corresponding relation.

According to the present embodiment, in response to the local area network conference request being detected, the first NAN device may firstly acquire the identity of each of the plurality of conference members required to attend the conference. The plurality of conference members correspond to the plurality of NAN devices which include the first NAN device and the at least one second NAN device. Subsequently, the first NAN device may determine the communication level of each of the plurality of conference members based on the identity of each of the plurality of conference members, and establish the corresponding relation between the transmission level of the data resource and the communication level of each of the plurality of conference members. Further, the first NAN device may create the first NAN conference group, and invite the at least one second NAN device to join the first NAN conference group. At last, the first NAN device may perform data transmission in the first NAN conference group based on the corresponding relation. It may be seen, the first NAN device may achieve a multi-user conference function in the local area network through the NAN function. Safety and privacy of the conference function may be improved compared to the conference function achieved through the mobile communication network. Furthermore, data transmission for data resources in the conference group may be accurately controlled based on the corresponding relation between the transmission level of data resources and the communication level of the conference members. Thus, the accuracy of data transmission control in the local area network conference function may be improved.

In some embodiments, the operation of the first NAN device performing data transmission in the first NAN conference group based on the corresponding relation may include following operations. The first NAN device may acquire a transmission level of a first data resource to be transmitted, and inquire a corresponding relation of the first data resource. The first NAN device may determine a target communication level of a conference member corresponding to the transmission level of the first data resource. The first NAN device may transmit the first data resource to a second NAN device of the conference member having the target communication level.

In details, the transmission level of the first data resource may be proactively set by the user. Alternatively, the first NAN device may intelligently analyze significance of the first data resource (for example, analyzes the significance based on key words), and further determines the transmission level of the first data resource. A transmission type of the first data resource may include directed transmission and broadcasting.

According to the present embodiment, the first NAN device may intelligently analyze the transmission level of the first data resource to be transmitted and share the data to an appropriate conference member based on the corresponding relation. In this way, the first data resource may not be acquired by all conference members, improving the accuracy and flexibility of data transmission of the conference function.

In some embodiments, the operation of the first NAN device transmitting the first data resource to be transmitted to the second NAN device of the conference member having the target communication level may include following operations. The first NAN device may detect whether a second data resource to be transmitted is present in the first NAN conference group. In response to the second resource being not present, the first NAN device may select a first transmission channel from a transmission channel collection and transmit the first data resource through the first transmission channel. In response to the second resource being present, the first NAN device may determine a second transmission channel and a target data transmission window of the first data resource, and transmit the first data resource through the second transmission channel in the target data transmission window.

The first NAN device may select a channel with highest transmission quality or a largest bandwidth as the first transmission channel. The present disclosure does not limit a condition of selecting the first transmission channel. The target data transmission window may be determined based on transmission priorities of the first and second data resources. That is, a data resource with a higher priority may be transmitted before a data resource with a lower priority.

It may be seen, according to the present embodiment, when facing a situation of resources conflicting in the conference group, the first NAN device may accurately schedule and transmit data resources through a frequency division or time division strategy.

In some embodiments, the operation of the first NAN device acquiring the identity of each of the plurality of conference members required to attend the conference may include following operations. The first NAN device may activate the NAN function, and use the NAN function to broadcast a service discovery frame SDF in a first discovery window DW. The SDF may include a service descriptor attribute (SDA), and the SDA may be configured to indicate the conference information of the local area network conference request. The first NAN device may receive a feedback message from each of the at least one second NAN device in the first DW, and acquire the identity of each of the plurality of conference members of each of the at least one second NAN device based on the feedback message.

In some embodiments, the service descriptor attribute of the SDF may include a conference name, information of conference participants, etc. The first NAN device may determine whether to allow the second NAN device providing the feedback message to join the first NAN conference group based on the feedback message after receiving the feedback message. In other words, mutual authentication mechanism may be utilized to determine the conference members.

It may be seen, according to the present embodiment, the first NAN device may interact with the at least one second NAN device through the SDF to accurately acquire the identity of each of the plurality of conference members. Since the first NAN device may determine the identity of each user in the local area network, the accuracy and speed of the operation may be relatively high.

In some embodiments, the operation of the first NAN device acquiring the identity of each of the plurality of conference members required to attend the conference may include following operations. The first NAN device may search a historical conference record database and acquire a historical conference record of each of the plurality of conference members required to attend the conference. The first NAN device may determine the identity of each of the plurality of conference members based on the acquired historical conference record.

In some embodiments, the historical conference record may include the conference name, a conference time, conference members and identifiers of devices etc.

In details, the first NAN conference group created by the first NAN device may have a location attribute. Therefore, historical conference records may be divided into different conference clusters based on conference locations. In this way, an associated conference cluster may be determined based on a location of the first NAN conference group, and the identity of each of the plurality of conference members may be acquired from the associated conference cluster rapidly.

It may be seen, according to the present embodiment, the first NAN device may accurately determine the identity of each of the plurality of conference members in the first NAN conference group by inquiring historical conference records, which is relatively fast.

In some embodiments, after the first NAN device establishes the corresponding relation between the transmission level of data resources and communication level of the conference members, the method may further include an operation of the first NAN device transmitting the corresponding relation to each of the at least one second NAN device.

It may be seen, according to the present embodiment, the first NAN device may share the corresponding relation to the devices of other conference members in the first NAN conference group. Thus, when performing data transmission, the devices of other conference members may control transmission of the data resource based on the corresponding relation, which may improve the efficiency and accuracy of data transmission in the conference group.

In some embodiments, the method may further include following operation. The first NAN device may receive a conference attending request from a third NAN device. In response to the first NAN device detecting the verification information sent from the third NAN device, and the verification information being verified, the first NAN device may allow the third NAN device to join the first NAN conference group network.

It may be seen, according to the present embodiment, for a new user requesting to join the conference group, the first NAN device may verify validity of the user via the verification information, and allow the third NAN device to join the current first NAN conference group in response to an identity of the new user being verified.

Figure 3:
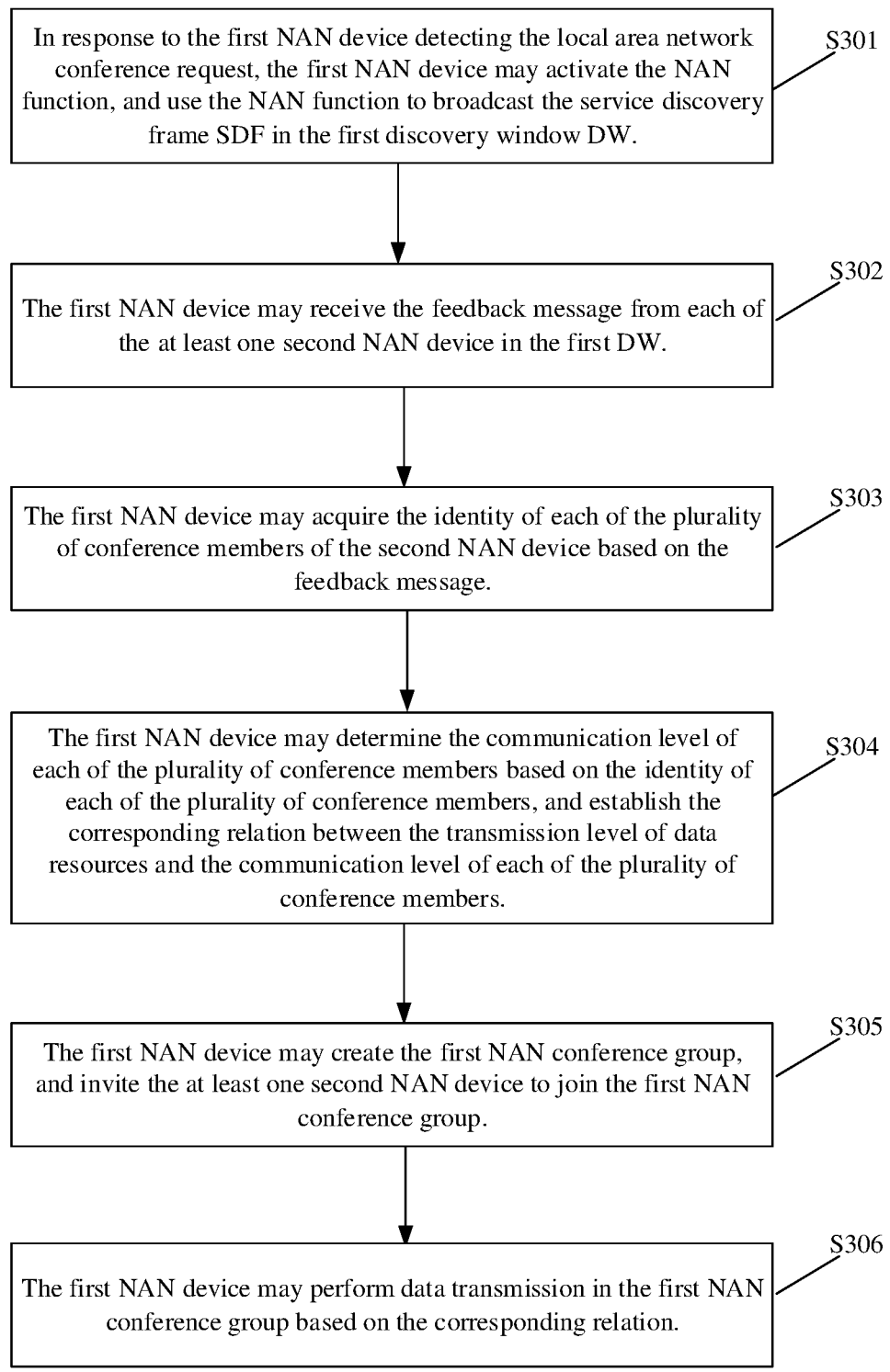
FIG. 3 illustrates a flow chart of a data transmission control method according to another embodiment of the present disclosure.

Similar to embodiments shown in FIG. 2, FIG. 3 illustrates a flowchart of a data transmission control method according to another embodiment of the present disclosure. The method may be implemented in the electronic device shown in FIG. 1. The electronic device may include a radar sensor. As illustrated, the data transmission control method may include the following operations.

In an operation S301, in response to the first NAN device detecting the local area network conference request, the first NAN device may activate the NAN function, and use the NAN function to broadcast the service discovery frame SDF in the first discovery window DW. The SDF may include the service descriptor attribute SDA, which may be configured to indicate the conference information of the local area network conference request.

In an operation S302, the first NAN device may receive the feedback message from each of the at least one second NAN device in the first DW.

In an operation S303, the first NAN device may acquire the identity of each of the plurality of conference members of the second NAN device based on the feedback message. The plurality of conference members correspond to the plurality of NAN devices. The plurality of NAN devices may include the first NAN device and the at least one second NAN device.

In an operation S304, the first NAN device may determine the communication level of each of the plurality of conference members based on the identity of each of the plurality of conference members, and establish the corresponding relation between the transmission level of the data resource and the communication level of each of the plurality of conference members.

In an operation S305, the first NAN device may create the first NAN conference group, and invite the at least one second NAN device to join the first NAN conference group.

In an operation S306, the first NAN device may perform data transmission in the first NAN conference group based on the corresponding relation.

According to the present embodiment, in response to the local area network conference request being detected, the first NAN device may acquire the identity of each of the plurality of conference members required to attend the conference. The plurality of conference members correspond to the plurality of NAN devices which include the first NAN device and the at least one second NAN device. Subsequently, the first NAN device may determine the communication level of each of the plurality of conference members based on the identity of each of the plurality of conference members, and establish the corresponding relation between the transmission level of data resources and the communication level of each of the plurality of conference members. Further, the first NAN device may create the first NAN conference group, and invite the at least one second NAN device to join the first NAN conference group. At last, the first NAN device may perform data transmission in the first NAN conference group based on the corresponding relation. It may be seen, the first NAN device may achieve multi-user conference function in the local area network through the NAN function. The safety and privacy of the conference function may be improved, compared to the conference function achieved through the mobile communication network. Furthermore, data transmission for data resources in the conference group may be accurately controlled based on the corresponding relation between the transmission level of data resources and the communication level of each of the plurality of conference members. Thus, the accuracy of data transmission control in the local area network conference function may be improved.

Furthermore, the first NAN device may interact with the at least one second NAN device through the SDF to accurately acquire the identity of each of the plurality of conference members. Since the first NAN device may determine the identity of each of the plurality of conference members in the local area network at real-time, the accuracy and speed of the operation may be relatively high.

Figure 4:
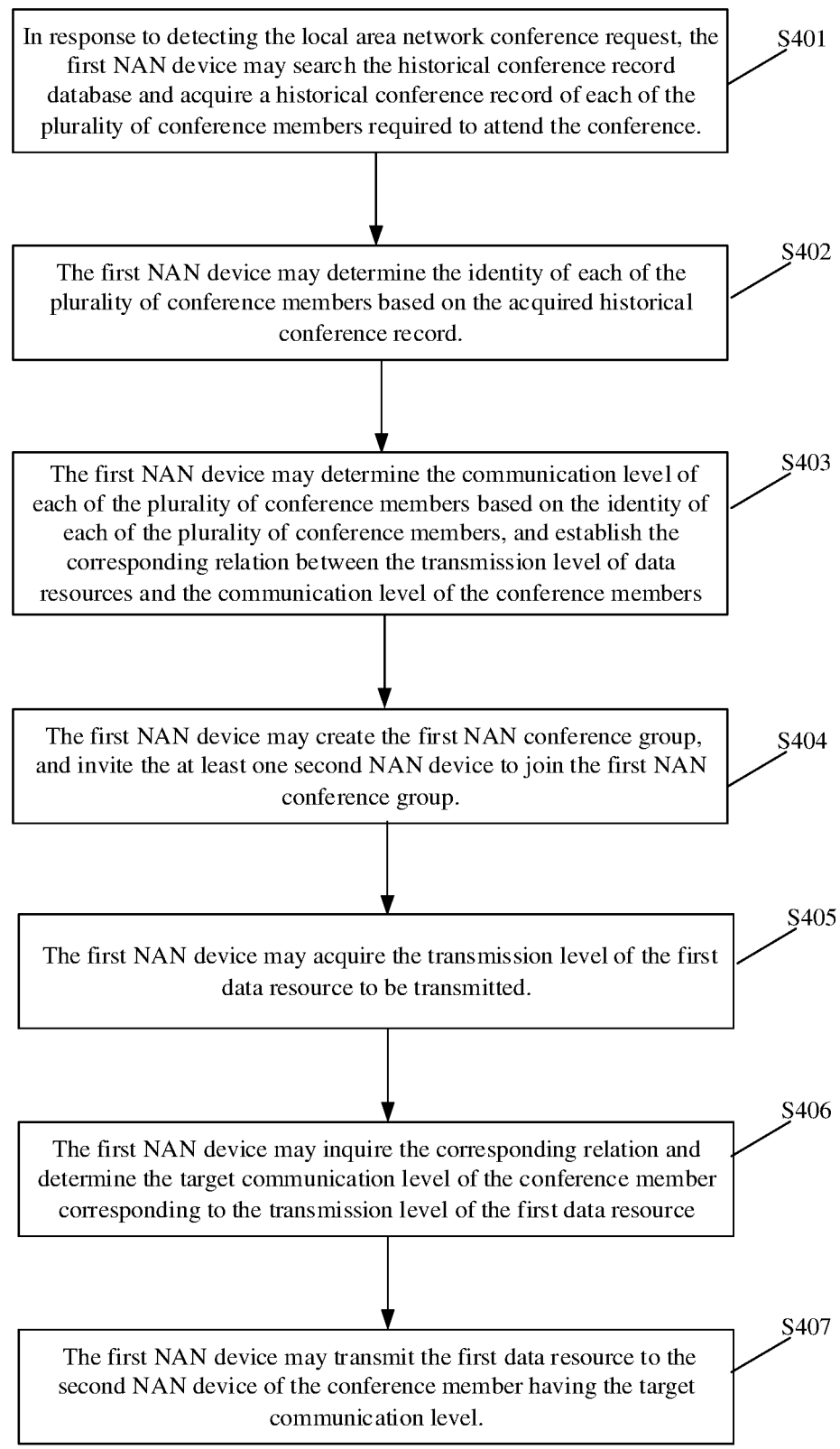
FIG. 4 illustrates a flow chart of a data transmission control method according to yet another embodiment of the present disclosure.

Similar to embodiments shown in FIG. 2, FIG. 4 illustrates a flowchart of a data transmission control method according to another embodiment of the present disclosure. The method may be implemented in the electronic device shown in FIG. 1. The electronic device may include a radar sensor. As illustrated, the data transmission control method may include the following operations.

In an operation S401, in response to detecting the local area network conference request, the first NAN device may search the historical conference record database and acquire a historical conference record of each of the plurality of conference members required to attend the conference.

In an operation S402, the first NAN device may determine the identity of each of the plurality of conference members based on the acquired historical conference record. The plurality of conference members correspond to the plurality of NAN devices, and the plurality of NAN devices include the first NAN device and the at least one second NAN device.

In an operation S403, the first NAN device may determine the communication level of each of the plurality of conference members based on the identity of each of the plurality of conference members, and establish the corresponding relation between the transmission level of data resources and the communication level of each of the plurality of conference members.

In an operation S404, the first NAN device may create the first NAN conference group, and invite the at least one second NAN device to join the first NAN conference group.

In an operation S405, the first NAN device may acquire the transmission level of the first data resource to be transmitted.

In an operation S406, the first NAN device may inquire the corresponding relation and determine the target communication level of the conference member corresponding to the transmission level of the first data resource.

In an operation S407, the first NAN device may transmit the first data resource to the second NAN device of the conference member having the target communication level.

According to the present embodiment, in response to the local area network conference request being detected, the first NAN device may acquire the identity of each of the plurality of conference members required to attend the conference. The plurality of conference members correspond to the plurality of NAN devices which include the first NAN device and the at least one second NAN device. Then, the first NAN device may determine the communication level of each of the plurality of conference members based on the identity of each of the plurality of conference members, and establish the corresponding relation between the transmission level of data resources and the communication level of each of the plurality of conference members. Subsequently, the first NAN device may create the first NAN conference group, and invite the at least one second NAN device to join the first NAN conference group. At last, the first NAN device may perform data transmission in the first NAN conference group based on the corresponding relation. It may be seen, the first NAN device may achieve the multi-user conference function in the local area network through the NAN function. The safety and privacy of the conference function may be improved, compared to the conference function achieved through the mobile communication network. Furthermore, data transmission for data resources in the conference group may be accurately controlled based on the corresponding relation between the transmission level of data resources and the communication level of each of the plurality of conference members. Thus, the accuracy of data transmission control in the local area network conference function may be improved.

Furthermore, the first NAN device may intelligently analyze the transmission level of the first data resource to be transmitted and share the data to the appropriate conference member based on the corresponding relation. In this way, the first data resource may not be acquired by all the conference members, improving the accuracy and flexibility of data transmission of the conference function.

Figure 5:
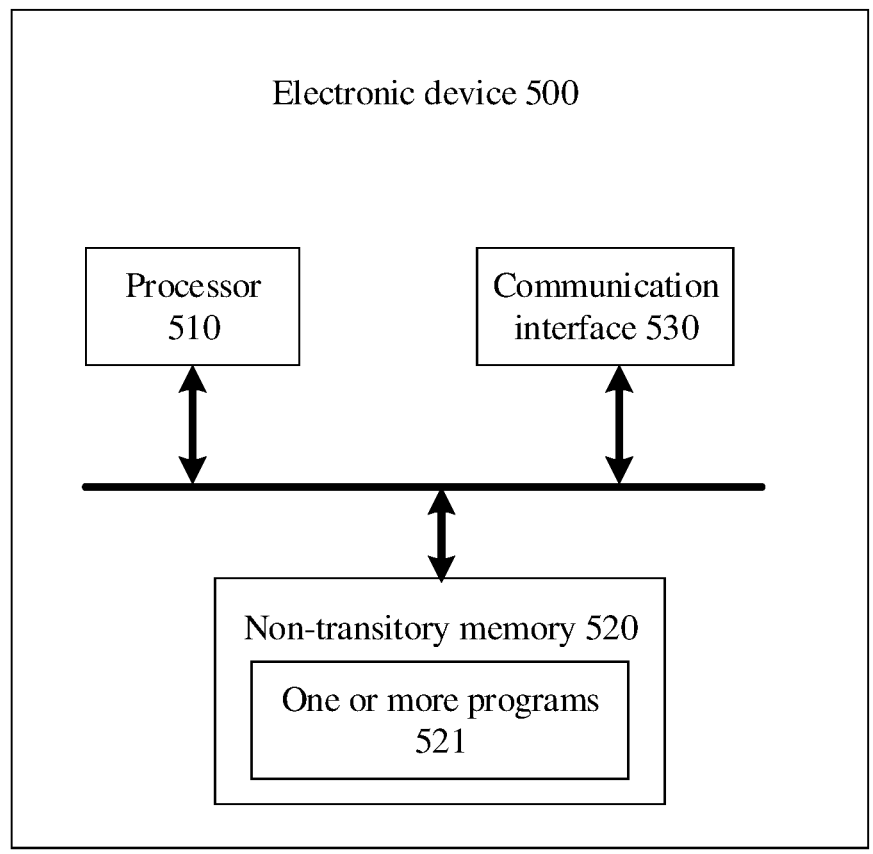
FIG. 5 is a schematic diagram of an electronic device according to an embodiment of the present disclosure.

Similar to embodiments shown in FIGS. 2-4, FIG. 5 is a schematic diagram of an electronic device 500 according to an embodiment of the present disclosure. As shown in FIG. 5, the electronic device may include a processor 510, a non-transitory memory 520, a communication interface 530 and one or more programs 521. The one or more programs 521 are stored in the non-transitory memory 520 and are configured to be executed by the processor 510. The one or more programs 521 may include instructions for performing following operations.

In response to the local area network conference request being detected, the identity of each of the plurality of conference members required to attend the conference may be acquired. The plurality of conference members correspond to the plurality of NAN devices, and the plurality of NAN devices may include the first NAN device and the at least one second NAN device.

The communication level of each of the plurality of conference members may be determined based on the identity of each of the plurality of conference members. The corresponding relation between the transmission level of data resources and the communication level of each of the plurality of conference members may be established.

The first NAN conference group may be created, and the at least one second NAN device may be invited to join the first NAN conference group.

Data transmission in the first NAN conference group may be performed based on the corresponding relation.

According to the present embodiment, in response to the local area network conference request being detected, the first NAN device may firstly acquire the identity of each of the plurality of conference members required to attend a conference. The plurality of conference members correspond to the plurality of NAN devices which include the first NAN device and the at least one second NAN device. Subsequently, the first NAN device may determine the communication level of each of the plurality of conference members based on the identity of each of the plurality of conference members, and establish the corresponding relation between the transmission level of data resources and the communication level of each of the plurality of conference member. Further, the first NAN device may create the first NAN conference group, and invite the at least one second NAN device to join the first NAN conference group. At last, the first NAN device may perform data transmission in the first NAN conference group based on the corresponding relation. It may be seen, the first NAN device may achieve multi-user conference function in the local area network through the NAN function. The safety and privacy of the conference function may be improved, compared to the conference function achieved through the mobile communication network. Furthermore, data transmission for data resources in the conference group may be accurately controlled based on the corresponding relation between the transmission levels of data resources and communication levels of the conference members. Thus, the accuracy of data transmission control in the local area network conference function may be improved.

In some embodiments, in order to perform data transmission in the first NAN conference group based on the corresponding relation, the instruction included in the programs may specifically be configured to: acquire the transmission level of the first data resource to be transmitted; inquire the corresponding relation, determine the target communication level of the conference member corresponding to the transmission level of the first data resource; and transmit the first data resource to the second NAN device of the conference member having the target communication level.

In some embodiments, in order to transmit the first data resource to the second NAN device of the conference member having the target communication level, the instructions included in the programs may specifically be configured to perform following operations.

Presence of the second data resource to be transmitted in the first NAN conference group may be detected. In response to the second data recourse being not present, the first transmission channel may be selected from the transmission channel collection, and the first data resource may be transmitted through the first transmission channel. In response to the second data resource being present, the second transmission channel and the target data transmission window of the first data resource may be determined, and the first data resource may be transmitted through the second transmission channel and in the target data transmission window.

In some embodiments, in order to acquire the identity of each of the plurality of conference members required to attend the conference, the instructions included in the programs may specifically be configured to: activate the NAN function, and use the NAN function to broadcast the service discovery frame (SDF) in the first discovery window (DW), wherein the SDF includes the service descriptor attribute (SDA) configured to indicate the conference information of the local area network conference request; receive the feedback message from each of the at least one second NAN device in the first DW; and acquire the identity of each of the plurality of conference members corresponding to the at least one second NAN device based on the feedback message.

In some embodiments, in order to acquire the identity of each of the plurality of conference members required to attend the conference, the instructions included in the programs may specifically be configured to: search the historical conference record database, acquire the historical conference record of each of the plurality of conference members required to attend the conference; and determine the identity of each of the plurality of conference members based on the historical conference record.

In some embodiments, the instructions included in the programs may further be configured to: transmit the corresponding relation to each of the at least one second NAN device after establishing the corresponding relation between the transmission level of data resources and the communication level of each of the plurality of conference members.

In some embodiments, the instructions included in the programs may further be configured to: receive the conference attending request sent from the third NAN device; and allow the third NAN device to join the first NAN conference group in response to the verification information of the third NAN device being verified.

The foregoing mainly describes the solutions of the implementations of the present application from the perspective of the implementation process of the method. It may be understood that, in order to achieve the above functions, the terminal device may include hardware structures and/or software modules to perform the respective functions. Those skilled in the art should readily realize that, in combination with the exemplary units and scheme steps or operations described in the implementations provided herein, the present disclosure may be implemented in hardware or a combination of hardware and computer software. Whether a function is implemented by way of hardware or computer software driving hardware depends on the particular application and design constraints of the technical solution. Those skilled in the art may use different methods to implement the described functions for each particular application, but such implementation should not be considered as beyond the scope of the present disclosure.

According to the implementations of the present disclosure, functional units may be divided for the terminal device according to the foregoing method examples. For example, functional units may be divided according to corresponding functions and two or more functions may be integrated into one processing unit. The above-mentioned integrated unit may be implemented in the form of hardware or software functional units. It should be noted that the division of units in the implementations of the present disclosure is schematic and is merely a logical function division; there may be other division modes in actual implementations.

Figure 6:
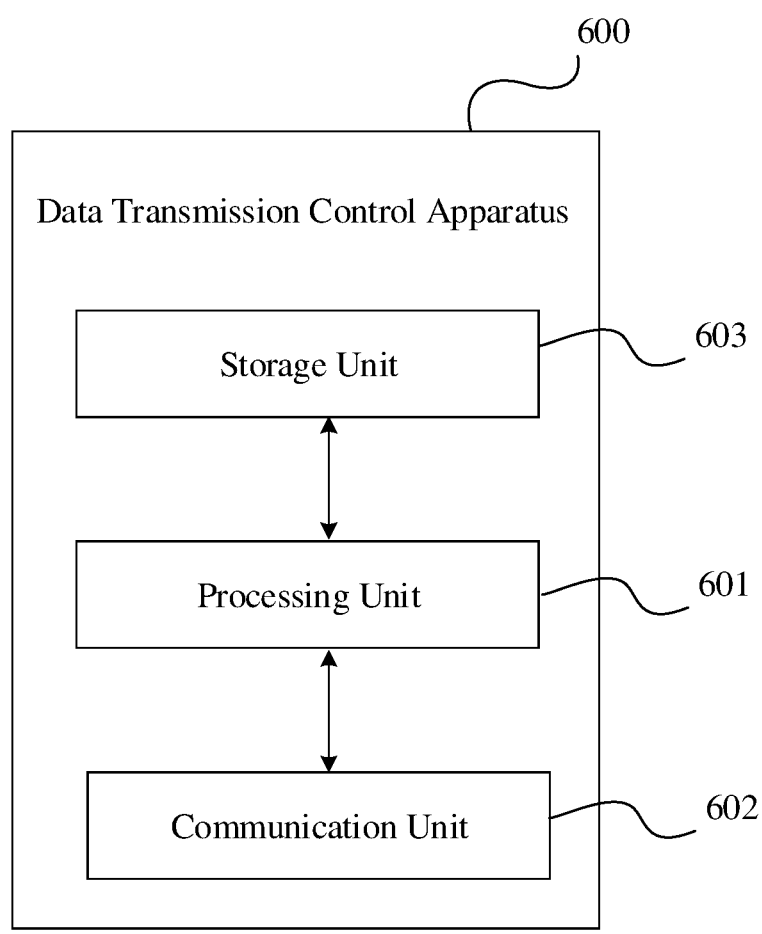
FIG. 6 illustrates different functional units of a data transmission control apparatus according to an embodiment of the present disclosure.

FIG. 6 illustrates different functional units of a data transmission control apparatus according to an embodiment of the present disclosure. The data transmission control apparatus 600 may be implemented in a first NAN device. The data transmission control apparatus 600 includes a processing unit 601 and a communication unit 602.

The processing unit 601 is configured to: acquire the identity of each of the plurality of conference members required to attend the conference through the communication unit 602 in response to the local area network conference request being detected, wherein the plurality of conference members correspond to the plurality of NAN devices which include the first NAN device and the at least one second NAN device; determine the communication level of each of the plurality of conference members based on the identity of each of the plurality of conference members, and establish the corresponding relation between the transmission level of data resources and the communication level of each of the plurality of conference members; create the first NAN conference group, and invite the at least one second NAN device to join the first NAN conference group; and perform data transmission in the first NAN conference group based on the corresponding relation.

In some embodiments, the data transmission control apparatus 600 may further include a storage unit 603 configured to store program codes and data of the electronic device. The processing unit 601 may be a processor. The communication unit 602 may be a touch-control screen or a transceiver. The storage unit 603 may be a memory.

According to the present embodiment, in response to the local area network conference request being detected, the first NAN device may firstly acquire the identity of each of the plurality of conference members required to attend the conference. The plurality of conference members correspond to the plurality of NAN devices which include the first NAN device and the at least one second NAN device. Then, the first NAN device may determine the communication level of each of the plurality of conference members based on the identity of the plurality of conference members, and establish the corresponding relation between the transmission level of data resources and the communication level of each of the plurality of conference members. Further, the first NAN device may create the first NAN conference group, and invite the at least one second NAN device to join the first NAN conference group. At last, the first NAN device may perform data transmission in the first NAN conference group based on the corresponding relation. It may be seen, the first NAN device may achieve multi-user conference function in the local area network through the NAN function. The safety and privacy of the conference function may be improved, compared to the conference function achieved through the mobile communication network. Furthermore, data transmission for data resources in the conference group may be accurately controlled based on the corresponding relation between the transmission levels of data resources and communication levels of the conference members. Thus, the accuracy of data transmission control in the local area network conference function may be improved.

In some embodiments, in order to perform data transmission in the first NAN conference group based on the corresponding relation, the processing unit 601 may specifically be configured to: acquire the transmission level of the first data resource to be transmitted; inquire the corresponding relation and determine the target communication level of the conference member corresponding to the transmission level of the first data resource; and transmit the first data resource to the second NAN device of the conference member having the target communication level.

In some embodiments, in order to transmit the first data resource to the second NAN device of the conference member having the target communication level, the processing unit 601 may specifically be configured to: detect the presence of the second data resource to be transmitted in the first NAN conference group; in response to the second data resource being not present, select the first transmission channel from the transmission channel collection, and transmit the first data resource through the first transmission channel; and in response to the second data resource being present, determine the second transmission channel and the target data transmission window of the first data resource, and transmit the first data resource through the second transmission channel in the target data transmission window.

In some embodiments, in order to acquire the identity of each of the plurality of conference members required to attend the conference, the processing unit 601 may specifically be configured to: activate the NAN function, and use the NAN function to broadcast the service discovery frame (SDF) in the first discovery window (DW), wherein the SDF includes the service descriptor attribute (SDA) configured to indicate the conference information of the local area network conference request; receive the feedback message from each of the at least one second NAN device in the first DW; and acquire the identity of each of the plurality of conference members corresponding to the at least one second NAN device based on the feedback message.

In some embodiments, in order to acquire the identity of each of the plurality of conference members required to attend the conference, the processing unit 601 may specifically be configured to: search the historical conference record database, and acquire the historical conference record of each of the plurality of conference members required to attend the conference; and determine the identity of each of the plurality of conference members based on the historical conference record.

In some embodiments, the processing unit 601 may further be configured to: transmit the corresponding relation to each of the at least one second NAN device through the communication unit 602 after establishing the corresponding relation between the transmission levels of data resources and the communication level of each of the plurality of conference members.

In some embodiments, the processing unit 601 may further be configured to: receive the conference attending request from the third NAN device from the communication unit 602; and allow the third NAN device to join the first NAN conference group in response to the verification information of the third NAN device being verified.

Embodiments of the present disclosure further provide a non-volatile computer readable storage medium configured to store computer programs for electronic data exchange. The computer programs are configured to implement all or part of the method described in any of the foregoing embodiments on a computer. The computer may include an electronic device.

Embodiments of the present disclosure further provide a computer program product. The computer program product includes a non-volatile computer readable storage medium storing computer programs. The computer programs are configured to implement all or part of the operations of the method as described in the foregoing embodiments. The computer program product may be a software installation package. The computer may include an electronic device.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps may be performed in other order or simultaneously. Also, it will be appreciated by those skilled in the art that the embodiments described in the specification are exemplary embodiments and the actions and modules involved are not necessarily necessary for the present disclosure.

In the foregoing embodiments, descriptions of each embodiment are emphasized respectively, and parts which are not elaborated in a certain embodiment may subject to relevant descriptions of other embodiments.

The apparatus disclosed in embodiments provided herein may be implemented in other ways. For example, the device/apparatus embodiments described above are merely illustrative; for instance, the division of the unit is only a logical function division and there may be another way of division during actual implementations, for example, multiple units or components may be combined or may be integrated into another system, or some features may be ignored or not performed. In addition, coupling or communication connection between each displayed or discussed component may be direct coupling or communication connection, or may be indirect coupling or communication among devices or units via some interfaces, and may be electrical and mechanical or adopt other forms.

The units described as separate components may or may not be physically separate, the components shown as units may or may not be physical units, and namely they may be in the same place or may be distributed to multiple network elements. Part or all of the units may be selected per actual needs to achieve the purpose of the technical solutions of the embodiments.

In addition, the functional units in various embodiments of the present disclosure may be integrated in one processing unit, or each unit may be physically present, or two or more units may be integrated in one unit. The above-mentioned integrated unit may be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various embodiments of the present disclosure. The memory described above includes a variety of media that may store programs codes, such as a USB disk, a read-only memory (ROM), a random-access memory (RAM), a mobile hard disk, a magnetic disk, or an optical disk and so on.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random-access memory (RAM), Disk or CD, and so on.

The forgoing specifically illustrates the embodiment of the present disclosure. The principles and embodiments of the present disclosure are illustrated by means of examples. The above embodiment illustrations are just used to help to understand the method and core concepts of the present disclosure. For a person skilled in the art, according to the idea of the present disclosure, changes may be made based on the embodiments and application ranges. In conclusion, the present disclosure shall not be limited by the specification.

What is claimed is:

1. A method for data transmission control, applied in a first neighbor awareness network (NAN) device, comprising:

acquiring an identity of each of a plurality of conference members required to attend a conference in response to a local area network conference request being detected, wherein the plurality of conference members correspond to a plurality of NAN devices, and the plurality of NAN devices include the first NAN device and at least one second NAN device;

determining a communication level of each of the plurality of conference members based on the identity of each of the plurality of conference members, and establishing a corresponding relation between a transmission level of a data resource and a communication level of each of the plurality of conference members, wherein the communication level comprises at least two communication levels, at least one of the plurality of conference members is in one of the at least two communication levels, at least one of the plurality of conference members is in another one of the at least two communication levels, and the at least one of the plurality of conference members in one of the at least two communication levels is different from the at least one of the plurality of conference members in another one of the at least two communication levels, wherein the transmission level comprises at least two transmission levels, the data resource comprises at least two data resources, one of the at least two data resources is in one of the at least two transmission levels, another one of the at least two data resources is in another one of the at least two transmission levels, and the data resource in one of the at least two transmission levels is different from the data resource in another one of the at least two transmission levels;

creating a first NAN conference group, and inviting the at least one second NAN device to join the first NAN conference group; and performing data transmission in the first NAN conference group based on the corresponding relation.

2. The method of claim 1, wherein the performing data transmission in the first NAN conference group based on the corresponding relation comprises:

acquiring a transmission level of a first data resource to be transmitted;

inquiring the corresponding relation and determining a target communication level of a conference member corresponding to the transmission level of the first data resource; and transmitting the first data resource a second NAN device of the conference member having the target communication level.

3. The method of claim 2, wherein the transmitting the first data resource the second NAN device of the conference member having the target communication level comprises:

detecting presence of a second data resource to be transmitted in the first NAN conference group;

selecting a first transmission channel from a transmission channel collection, and transmitting the first data resource through the first transmission channel, in response to the second data resource being not present; and determining a second transmission channel and a target data transmission window of the first data resource, and transmitting the first data resource through the second transmission channel in the target data transmission window, in response to the second data resource being present.

4. The method of claim 1, wherein the acquiring the identity of each of the plurality of conference members required to attend the conference comprises:

activating a NAN function, and using the NAN function to broadcast a service discovery frame (SDF) in a first discovery window (DW), wherein the SDF comprises a service descriptor attribute (SDA) configured to indicate conference information of the local area network conference request;

receiving a feedback message from each of the at least one second NAN device in the first DW; and acquiring the identity of each conference member of the at least one second NAN device based on the feedback message.

5. The method of claim 4, wherein the SDA of the SDF comprises a conference name and information of the plurality of conference members.

6. The method of claim 1, wherein the acquiring the identity of each of the plurality of conference members required to attend the conference, comprises:

searching a historical conference record database, and acquiring a historical conference record of each of the plurality of conference members required to attend the conference; and determining the identity of each of the plurality of conference members based on the acquired historical conference record.

7. The method of claim 1, further comprising:

after the establishing the corresponding relation between the transmission level of the data resource and the communication level of each of the plurality of conference members, transmitting the corresponding relation to each of the at least one second NAN device.

8. The method of claim 7, further comprising:

receiving a conference attending request from a third NAN device; and allowing the third NAN device to join the first NAN conference group in response to verification information of the third NAN device being verified and detected.

9. The method of claim 8, wherein, in the corresponding relation, the transmission level of the data resource corresponds to one or more transmission levels of each of the plurality of conference members.

10. A data transmission control apparatus, applied in a first neighbor awareness network (NAN) device and comprising a processing unit and a communication unit, wherein the processing unit is configured to perform operations of:

acquiring an identity of each of a plurality of conference members required to attend a conference through the communication unit in response to a local area network conference request being detected, wherein the plurality of conference members correspond to a plurality of NAN devices, and the plurality of NAN devices include the first NAN device and at least one second NAN device;

determining a communication level of each of the plurality of conference members based on the identity of each of the plurality of conference members, and establishing a corresponding relation between a transmission level of a data resource and the communication level of each of the plurality of conference members, wherein the communication level comprises at least two communication levels, at least one of the plurality of conference members is in one of the at least two communication levels, at least one of the plurality of conference members is in another one of the at least two communication levels, and the at least one of the plurality of conference members in one of the at least two communication levels is different from the at least one of the plurality of conference members in another one of the at least two communication levels, wherein the transmission level comprises at least two transmission levels, the data resource comprises at least two data resources, one of the at least two data resources is in one of the at least two transmission levels, another one of the at least two data resources is in another one of the at least two transmission levels, and the data resource in one of the at least two transmission levels is different from the data resource in another one of the at least two transmission levels;

creating a first NAN conference group, and invite the at least one second NAN device to join the first NAN conference group; and performing data transmission in the first NAN conference group based on the corresponding relation.

11. An electronic device comprising a processor, a non-transitory memory, a communication interface and one or more programs, wherein the one or more programs are stored in the non-transitory memory, and are executed by the processor to perform operations of:

acquiring an identity of each of a plurality of conference members required to attend a conference in response to a local area network conference request being detected, wherein the plurality of conference members correspond to a plurality of NAN devices, and the plurality of NAN devices include a first NAN device and at least one second NAN device;

determining a communication level of each of the plurality of conference members based on the identity of each of the plurality of conference members, and establishing a corresponding relation between a transmission level of a data resource and a communication level of each of the plurality of conference members, wherein the communication level comprises at least two communication levels, at least one of the plurality of conference members is in one of the at least two communication levels, at least one of the plurality of conference members is in another one of the at least two communication levels, and the at least one of the plurality of conference members in one of the at least two communication levels is different from the at least one of the plurality of conference members in another one of the at least two communication levels;

wherein the transmission level comprises at least two transmission levels, the data resource comprises at least two data resources, one of the at least two data resources is in one of the at least two transmission levels, another one of the at least two data resources is in another one of the at least two transmission levels, and the data resource in one of the at least two transmission levels is different from the data resource in another one of the at least two transmission levels;

creating a first NAN conference group, and inviting the at least one second NAN device to join the first NAN conference group; and performing data transmission in the first NAN conference group based on the corresponding relation.

12. The electronic device of claim 11, wherein when performing data transmission in the first NAN conference group based on the corresponding relation, the one or more programs are further executed by the processor to perform operations of:

acquiring a transmission level of a first data resource to be transmitted;

inquiring the corresponding relation and determining a target communication level of a conference member corresponding to the transmission level of the first data resource; and transmitting the first data resource a second NAN device of the conference member having the target communication level.

13. The electronic device of claim 12, wherein when transmitting the first data resource the second NAN device of the conference member having the target communication level, the one or more programs are further executed by the processor to perform operations of:

detecting presence of a second data resource to be transmitted in the first NAN conference group;

selecting a first transmission channel from a transmission channel collection, and transmitting the first data resource through the first transmission channel, in response to the second data resource being not present; and determining a second transmission channel and a target data transmission window of the first data resource, and transmitting the first data resource through the second transmission channel in the target data transmission window, in response to the second data resource being present.

14. The electronic device of claim 11, wherein when acquiring the identity of each of the plurality of conference members required to attend the conference, the one or more programs are further executed by the processor to perform operations of:

activating a NAN function, and using the NAN function to broadcast a service discovery frame (SDF) in a first discovery window (DW), wherein the SDF comprises a service descriptor attribute (SDA) configured to indicate conference information of the local area network conference request;

receiving a feedback message from each of the at least one second NAN device in the first DW; and acquiring the identity of each conference member of the at least one second NAN device based on the feedback message.

15. The electronic device of claim 14, wherein the SDA of the SDF comprises a conference name and information of the plurality of conference members.

16. The electronic device of claim 11, wherein when acquiring the identity of each of the plurality of conference members required to attend the conference, the one or more programs are further executed by the processor to perform operations of:

searching a historical conference record database, and acquiring a historical conference record of each of the plurality of conference members required to attend the conference; and determining the identity of each of the plurality of conference members based on the acquired historical conference record.

17. The electronic device of claim 11, wherein the one or more programs are further executed by the processor to perform operations of:

after the establishing the corresponding relation between the transmission level of the data resource and the communication level of each of the plurality of conference members, transmitting the corresponding relation to each of the at least one second NAN device.

18. The electronic device of claim 17, wherein the one or more programs are further executed by the processor to perform operations of:

receiving a conference attending request from a third NAN device; and allowing the third NAN device to join the first NAN conference group in response to verification information of the third NAN device being verified and detected.

19. The electronic device of claim 18, wherein, in the corresponding relation, the transmission level of the data resource corresponds to one or more transmission levels of each of the plurality of conference members.

20. The electronic device of claim 11, wherein the one or more programs are further executed by the processor to perform operations of:

acquiring, by the at least one second NAN device, information of the first NAN conference group and determining whether to join the first NAN conference group; and performing an interaction, by the first NAN device and the at least one second NAN device, enabling the at least one second NAN device to join the first NAN conference group.

\* \* \* \* \*